(12) United States Patent
Castro Lisboa et al.

(10) Patent No.: US 10,575,501 B2
(45) Date of Patent: Mar. 3, 2020

(54) SYSTEM AND DEVICE FOR MONITORING THE REPRODUCTIVE ACTIVITY OF ANIMALS

(71) Applicants: Pablo Castro Lisboa, Montevideo (UY); Julián Oreggioni Gamou, Montevideo (UY); Emilio Machado Zubelzu, Rocha (UY)

(72) Inventors: Pablo Castro Lisboa, Montevideo (UY); Julián Oreggioni Gamou, Montevideo (UY); Emilio Machado Zubelzu, Rocha (UY)

( * ) Notice: Subject to any disclaimer, the term of this patent is extended or adjusted under 35 U.S.C. 154(b) by 323 days.

(21) Appl. No.: 15/538,489

(22) PCT Filed: Nov. 30, 2015

(86) PCT No.: PCT/IB2015/059224
§ 371 (c)(1),
(2) Date: Jun. 21, 2017

(87) PCT Pub. No.: WO2016/103079
PCT Pub. Date: Jun. 30, 2016

(65) Prior Publication Data
US 2017/0367305 A1 Dec. 28, 2017

(30) Foreign Application Priority Data
Dec. 22, 2014 (UY) .......................... 35914

(51) Int. Cl.
*A01K 29/00* (2006.01)
*A61D 17/00* (2006.01)
(Continued)

(52) U.S. Cl.
CPC .......... *A01K 29/005* (2013.01); *A01K 11/006* (2013.01); *A61D 17/00* (2013.01);
(Continued)

(58) Field of Classification Search
CPC .... A01K 29/005; A01K 11/006; A61D 17/00; A61D 17/004; A61D 19/00
(Continued)

(56) References Cited

U.S. PATENT DOCUMENTS 3,844,273 A * 10/1974 Polson ................ A61B 5/0008
600/551
4,247,758 A 1/1981 Rodrian
(Continued)

FOREIGN PATENT DOCUMENTS

CA          2179501       7/1995
WO       2002/15792 A1   2/2002
(Continued)

OTHER PUBLICATIONS

Examination Report dated Oct. 14, 2019 issued in corresponding Uruguay Patent Application No. 035914.

*Primary Examiner* — John A Tweel, Jr.
(74) *Attorney, Agent, or Firm* — Ladas & Parry LLP

(57) ABSTRACT

The invention relates to a system for monitoring the reproductive activity of animals where a male mounts a female in order to mate, this system can determine the following information each time a male mounts a female, namely: whether or not the male has ejaculated, the date and time of ejaculation, and the identification of the female mounted. The system comprises an electronic sensor device placed on male animals, a radio-frequency identification tag placed on female animals, a system for preventing multiple or erroneous readings, and an electronic hand-held device for collecting information and configuring devices. The invention also includes a communication system and a central system that manages and concentrates all of the information, allowing the user to access said information in an organised, centralised and systematic manner.

30 Claims, 2 Drawing Sheets

(51) Int. Cl.
  *A01K 11/00*   (2006.01)
  *G06K 19/00*   (2006.01)
  *A61D 19/00*   (2006.01)
  *G06K 7/00*    (2006.01)
  *G07C 9/00*    (2020.01)

(52) U.S. Cl.
  CPC ......... *A61D 17/002* (2013.01); *A61D 17/004* (2013.01); *A61D 19/00* (2013.01); *G06K 7/00* (2013.01); *G06K 19/00* (2013.01); *G07C 9/00* (2013.01)

(58) Field of Classification Search
  USPC ...................................................... 340/573.3
  See application file for complete search history.

(56) References Cited

U.S. PATENT DOCUMENTS

| | | | |
|---|---|---|---|
| 4,503,808 A * | 3/1985 | McAlister | A61D 17/002 600/551 |
| 5,542,431 A | 8/1996 | Starzl et al. | |
| 5,566,679 A | 10/1996 | Herriott | |
| 7,083,575 B1 | 8/2006 | Claycomb et al. | |
| 7,878,149 B2 | 2/2011 | Voronin et al. | |
| 7,992,521 B2 | 8/2011 | Bocquier | |
| 8,066,179 B2 | 11/2011 | Lowe | |
| 9,078,416 B2 * | 7/2015 | Folkers | A01K 11/00 |
| 9,538,730 B1 * | 1/2017 | Torres | A61D 17/004 |
| 10,080,348 B2 * | 9/2018 | Sharpe | A01K 29/005 |
| 2005/0012623 A1 | 1/2005 | Jackson | |
| 2008/0128486 A1 | 6/2008 | Lowe | |
| 2010/0111359 A1 | 5/2010 | Bal et al. | |

FOREIGN PATENT DOCUMENTS

| | | |
|---|---|---|
| WO | 03/045273 A1 | 6/2003 |
| WO | 03061373 A2 | 7/2003 |

* cited by examiner

SYSTEM AND DEVICE FOR MONITORING THE REPRODUCTIVE ACTIVITY OF ANIMALS

RELATED APPLICATION

This application is a national phase entry under 35 USC 371 of International Patent Application No. PCT/IB2015/059224 filed on 30 Nov. 2015, which claims priority from Uruguay Application No. 35914 filed on 22 Dec. 2014, the disclosures of which are incorporated in their entirety by reference herein.

BACKGROUND OF THE INVENTION

In extensive livestock farming, the "natural service" is the main reproductive method, consisting of putting in a same space (called "corral") a large group of cows with a small number of bulls (e.g., 1 bull per 30 cows), for a period of time that may vary from one to several months (called "cattle breeding season"). The natural service involves essentially no technology, it follows a "black box" model where the inputs are cows, bulls, water and grass; and the outputs are pregnant cows. At most, a veterinarian is hired to perform specific actions at the beginning of the cattle breeding season (checking denture, general status of the animal, etc.). Ranchers more concerned with obtaining a good performance rely on an ultrasound scan of each cow at half-way of the breeding season, obtaining therefrom some information. Once the breeding season has finished, the pregnant cows are diagnosed: the natural service produces an average pregnancy-rate of 75% (with large variations among ranches from 30% to 98%). Even though obtaining rates near 100% depends on weather conditions, soil quality, among other factors that often are not well controlled, the average pregnancy-rate of the natural service is equally low. By obtaining process information, detecting problems in time and taking the respective corrective actions, there is no reason to believe that a substantial increase of the average pregnancy-rate is not possible.

There exist in the state of the art systems similar to the invention described in the present document, but whose purpose is the detection of estrus, generally for artificial insemination. Its application reaches narrow market segments but inclined to introduce technology in their processes, such as, for example, intensive livestock farming, feedlot, dairy or farms specialized in bovine reproduction.

An important subset of the above mentioned inventions is based on detecting the homosexual behavior that cows exhibit prior to or during the estrus cycle. By applying this principle, systems have been developed based on patches with paint placed on the back of the cow (see, for example, Herriot et al. U.S. Pat. No. 5,566,679). Painting patches break when a cow mounts another cow, which would indicate that the cow with the painted back is in heat, and the cow with the painted stomach is close to coming into heat. This is only possible in intensive livestock farming; in extensive livestock farming, installing a patch each time a bull mounting takes place is impractical, and automating detection of estrus is complicated and costly to implement, requiring human intervention to watch the painted animals. Furthermore, the cow estrus could happen at night (specially during hot weather in hot areas) and, as it only lasts a few hours, these systems may not detect it.

Bocquier (U.S. Pat. No. 7,992,521, Method and device for automatically detecting mating of animals, 2004) presents a device and method that allows the automatic detection of animal mounting. It can be seen simply as the modernization and automation of the classical "patch method" described above. It should be noted that this method/device at no time aims at detecting ejaculation. Indeed, the device is carried by a mounting animal that cannot ejaculate, referred to in general as male, but can be a castrated male, or a non-castrated male but unable to penetrate, or androgenized females. The Bocquier method is based on an electronic tag placed on the female and a device attached to the male by a belt, which has a detector of mounting attempts (which can be based on a pressure sensor on the stomach or a verticality sensor or a temperature sensor or a volumetric sensor) and an electronic tag reader placed in the female. Although having some points of contact with the present invention, both patents are fundamentally different regarding the problem they aim to solve. The present invention enhances the reproductive process based on the natural service (where necessarily the male has to ejaculate), while Bocquier et al. relates to the estrus detection (where there is no ejaculation). Moreover, there are several aspects that are not sufficiently addressed by Bocquier. In the first place, Bocquier proposes an anti-collision system for tag reading that works only to avoid male reading: it proposes essentially keeping a database with male IDs and excluding them if they were read. However, the tag reader carried by the male will read tags from any animal near the place of the mounting, and not necessarily the mounted female tag. This issue is important, since Bocquier's invention cannot identify, without a reasonable error margin, the mounted female. Secondly, Bocquier proposes a paternity checkup (col. 8 line 24) that cannot be implemented because if the system cannot detect ejaculation, there is no way to know who is the father. In third place, a reading of a tag (eventually located in the digestive tract of the female) involves radiating electromagnetic signals of great power that force the usage of large and heavy apparatus (since they require large batteries) and, therefore, harnesses or belts difficult to install, difficult to maintain and uncomfortable for the animal. Finally, Bocquier describes a process for the selection and classification of males that allows to conclude that his system would not work correctly with any male. This is a point that produces significant practical complications, since having to perform this process with all males would take too much time and would not be applicable to extensive livestock farming.

By using the same principle of detecting the homosexual behavior exhibited by cows prior and during estrus, systems and electronic devices, which are placed on the back of the cow and, by means of a switch, detect the mounting and report this information, have been developed, see, for example, Starzl et al. (U.S. Pat. No. 5,542,431, Heat detection for animals including Cows, 1996) or Claycomb et al. (U.S. Pat. No. 7,083,575, Electronic estrus detection device, 2006).

The other large subset of inventions found in the state of the art are based on detecting changes in the behavior of females. For example, when the cow is about to come into heat, their movement patterns change (particularly, they walk more) and they feed more. Therefore, by electronic devices installed on the legs or mouth, systems for detecting these changes with the purpose of determining if the cow is in heat have been proposed, see, for example Rodrian (U.S. Pat. No. 4,247,758, Animal Identification and estrus detections system, 1981) or Voronin et al. (U.S. Pat. No. 7,878, 149, Method and device for detecting estrus, 2011).

All solutions mentioned so far have the cow as a center, i.e., they are characterized by placing an active (requiring its own power source) and complex (intelligent, with sensors and means of communication, with a large size, complicated to install) device in the cow, thereby not being applicable in extensive livestock farming (where the ratio between the number of cows and the number of bulls is very high, and the production process needs to be developed with no or little human intervention).

Lowe (U.S. Pat. No. 8,066,179, Livestock Breeding and Management System, 2011) presents a method and system for managing livestock breeding that does not have the cow as the center. The system/method consists of each female having a RFID tag and each male carrying a device (referred to as "monitor" by Lowe) capable of detecting mounting (based on the position of the body of the male) and reading the female RFID tag. This allows to generate the following information: ID of the mounted female, ID of the mounting male, date and time of the mounting. This activity information is entered into a management system where information is generated for the management of the reproductive process. According to Lowe, the management information could be: date of conception, indication of whether the female is pregnant or not, estimated date of birth, conception success rate for male, fertility rate for female, ease impregnation rate of female and offspring family information.

Even though Lowe has several points of contact with the present invention, it has an essential difference in the way the efficacy of a mounting is determined, i.e., if there was ejaculation. Lowe determines ejaculation based on the time the mounting lasts (col. 6 line 50; col 7 line 35; col 9 line 56), whereas our invention has a specific system for detecting ejaculation. At this point, it is important to note that ejaculation by the male does not depend on the duration of the mounting. Short duration mountings can involve ejaculation, while long duration mountings may not involve ejaculation. Tag reading as used by Lowe (col. 6 line 55; col 6 line 63) has a significant error margin, adding more uncertainty to the determination of the efficacy of the mounting, since it could read the tag of any female within the reader's range of action and which is not being mounted. There are other aspects that are not sufficiently addressed by Lowe. In the first place, the tag reader carried by the male will read tags from any animal (including the same tag of the male) near the place of the mounting, and not necessarily the mounted cow tag. This issue is important, since Lowe's invention cannot identify, without a reasonable error margin, the mounted female. Secondly, the attachment is not solved correctly. The use of a collar, muzzle or harness (col. 6 line 10) is proposed. This type of solution is difficult to install, difficult to maintain and uncomfortable for the animal. In third place, the magnetic field configuration/modification of parameters of the RFID tag reader for attempting to enhance the detection of the mounting, made in a generic manner (col. 7 line 3) or manually for each monitor (col. 7 line 13) is impractical and its results are unreliable.

As will be shown in the following section, our invention discloses a system seeking to solve the same problem as Lowe, and it succeeds in adequately solving, with inventive step: the identification of the mounted female and determining whether the mounting was effective or not. The shortcomings shown by Bocquier and Lowe regarding the above mentioned points, question whether these inventions can truly solve the problems they claim to solve. For example, Lowe's system, by not being able to adequately identify the mounted female and/or determining whether the mounting was effective or not, would not provide the information he says his system will provide (date of conception, indication whether the female is pregnant or not, estimated date of birth, conception success rate for male, fertility rate for female, ease impregnation rate of female and offspring family information).

DESCRIPTION OF THE INVENTION

The present invention (hereinafter "System") aims to monitor the cattle breeding season, under extensive livestock farming conditions, through the bull activity. The System allows knowing whether the said bull has performed mounting activities, and which cows it has mounted, date and time the said mountings happened and their effectiveness (i.e., whether there was ejaculation or not). Since the System is based on placing electronic devices on each animal of the herd, in order to be applicable in extensive livestock farming, the device placed on the cow must be simple, cheap, easy to install, comfortable for the animal and cannot require maintenance of any kind (not even changing batteries). On the other hand, the device placed on the bull has more freedom (since there are 30 times less bulls than cows). Therefore, it can be more complex, be subject to sporadic maintenance routines, and it does not need to be so cheap, provided that the average cost per animal is within acceptable limits.

The System provides the veterinarian and the rancher, in a centralized, systematic and friendly manner, the necessary information for controlling the activity of all bulls and cows during the breeding season, accounting for the herd evolution. By way of example, if the System informs that a cow was never mounted after a certain period of time (that can be set) it is to be expected that there is a problem in its ovulation process, which needs to be studied and treated. If the cow is still breastfeeding, this can surely be solved by temporarily or definitively suspending breastfeeding. In other cases, this can be corrected by changing her diet. Should the problem be more serious, it can even be determined that the cow leave the herd and go to the slaughterhouse. On the contrary, if the cow was mounted several times and then stopped being mounted, it could be an indication of pregnancy. Another example is when the System informs about a bull that has not mounted any cow after a certain period of time (that can be set). This situation can be indicative of the bull having a physiological problem (for example, an injured leg) or that another bull assumed a dominant behavior in the herd and does not allow the first bull to mount cows. In this sense, the System allows an accurate determination of the relationships within the herd, for example, it allows the easy detection of a bull always mounting the same cow (phenomenon known as "dominant cow"). In these instances, the problem is solved by removing the dominant bull and/or cow from the herd.

The System provides real-time information allowing taking preventive and corrective actions on the herd, both on cows and bulls. The rancher and/or the veterinarian have information that allows them to make better decisions in time, which translates to an increase of the breeding season productivity.

Figure 1:
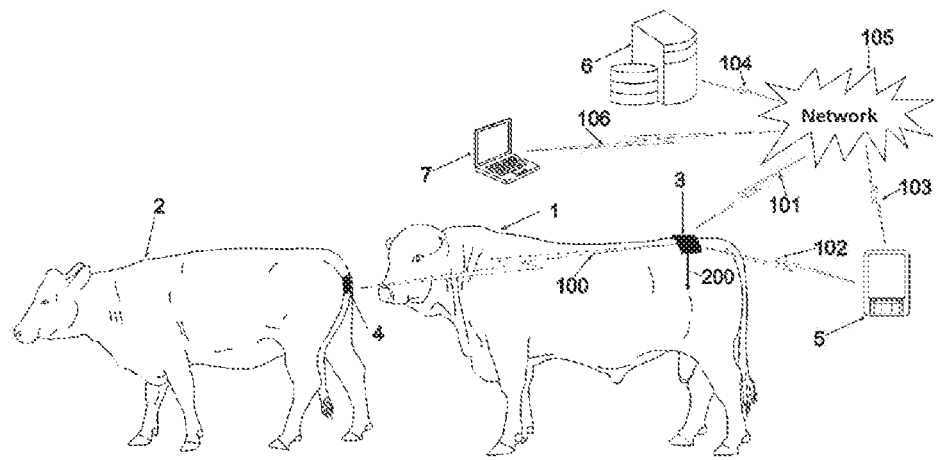
FIG. 1 shows a possible outline of the components of the present invention by depicting a possible way of interaction among them directly or by network 105. In particular, it shows the electronic device 3 placed in each bull 1, the radio-frequency identification tag 4 placed in each cow 2, the hand-held electronic device 5, and the central system 6, which concentrates and manages the information while functioning as user interface server 7. Moreover, possible locations for the devices used in animals are depicted.

FIG. 1 shows that the System is characterized by placing an electronic device 3 (hereinafter "Device") in each bull 1, by a radio-frequency identification tag 4 (hereinafter "Tag") placed on each cow 2 and having a number that uniquely identifies the cow having it, and a central system 6 (hereinafter "CS") that concentrates and manages information while functioning as the user interface server. The Device 3 reports the information to the CS 6 in order to allow the user 7 (hereinafter "User") to monitor the herd activity on a mobile device (e.g., laptop, cellphone or tablet) or on a personal computer via links 104 and 106 within the network 105 (hereinafter "Network"). The information the Device 3 reports to the CS 6 will pass through the Network 105 and can send it directly via link 101 and link 104, or through a hand-held electronic device 5 (hereinafter "Hand-Held") via link 102 and links 103 and 104. Each animal will have a unique identification number, which will be stored in the corresponding Tag 4, for cows, and it will be stored in the corresponding Device 3 for bulls.

Figure 2:
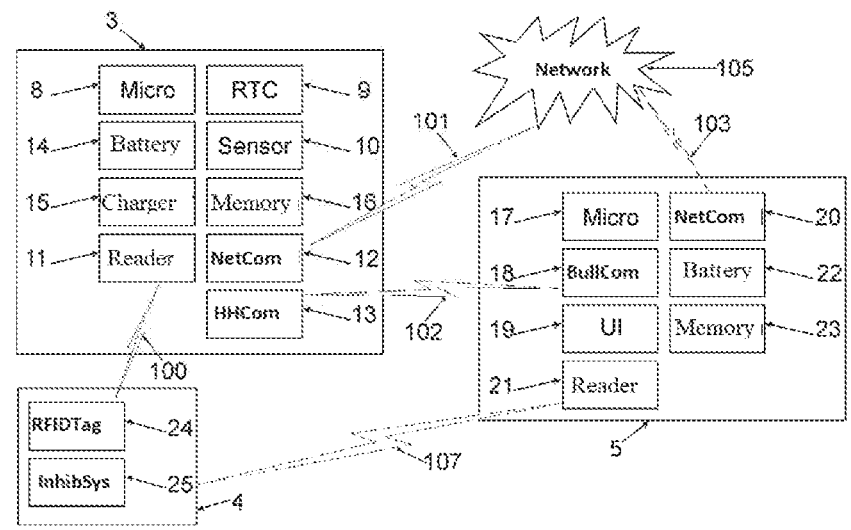
FIG. 2 presents the block diagram of a possible implementation of: the electronic device 3 placed in each bull 1, the radio-frequency identification tag 4 placed in each cow 2 and the hand-held electronic device 5. Moreover, examples of means of communication among these devices are shown.

As can be appreciated in FIG. 2, Device 3 is comprised by a low-cost microcontroller or standard microprocessor 8 (hereinafter "Microcontroller"), having internal peripherals: memories, timers, analog-to-digital converters, etc.; and it controls a set of external peripherals: a real-time clock RTC 9, an acceleration sensor 10 (hereinafter "Sensor"), a device 11 for Tag 4 reading (hereinafter "Reader"), a long-range wireless communication interface 12 to communicate with CS 6, and a short-range wired or wireless communication interface 13 to communicate with Hand-Held 5. All circuits of Device 3 are powered by a battery 14 which can be charged with a charger 15. In addition, the Microcontroller 8 can have an external memory 16.

Microcontroller 8 is in charge of generating the information of each mounting that will be transmitted. In the first place, it has the algorithms that allow to recognize, from the signal acquired by Sensor 10, mounting and ejaculation patterns. Secondly, through the Reader 11 and link 100, it obtains the identification number of the mounted cow 2. In third place, it obtains the date and hour of the mounting through the RTC 9.

Through communication interfaces 12 and 13, and the corresponding links 101 and 102, parameters of Device 3 can be read, written and configured, and information regarding the state of the herd is reported to CS 6. Collected information can be reported from Device 3 to CS 6 directly through a long-range wireless communication technology (link 101) such as, for example: mobile phone, WiFi, WiMax, Satellite link, etc. At the same time, it can be performed using a public data network (such as, for example, Internet) or though a private data network (for example, using RF links and repeater radios), both options are depicted by Network 105. On the other hand, Device 3 can report the collected information indirectly via Hand-Held 5. Communication between Device 3 and Hand-Held 5 can be made through a short-range wireless communication technology, such as NFC, Bluetooth, WiFi, etc.; or using a wired communication technology, such as USB, I2C, SPI, Ethernet, etc.

Figure 3:
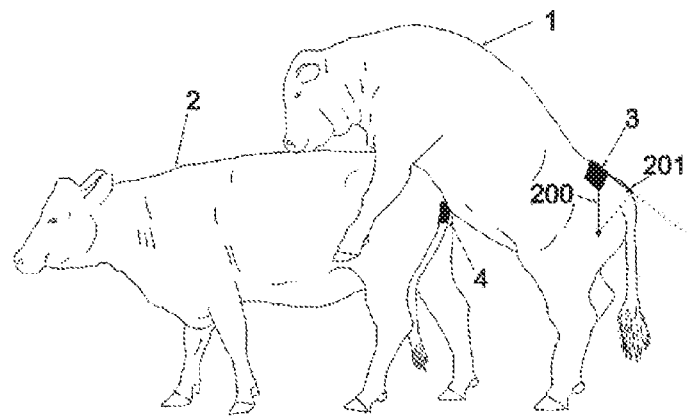
FIG. 3 shows the mounting moment between a bull 1 and a cow 2, wherein direct physical contact between bull 1 and the radio-frequency identification tag 4 can be appreciated. It further shows how gravity acceleration g 200 has a component parallel to the back of the bull gH 201 that appears during the mounting.

Data from Sensor 10 are sampled at a rate that can be configured. Mounting is detected when this information indicates that the position of the animal has sufficiently changed with respect to predefined and configurable thresholds. FIG. 3 shows the mounting moment, where it can be appreciated that gravity acceleration 200 (hereinafter g) has a component in the direction parallel to the bull's back 201 (hereinafter gH). However, in FIG. 1, where the bull is in normal position, it can be appreciated that the component of g 200 in the direction parallel to the bull's back gH 201 is null or substantially null. Therefore, by comparing gH 201 to a certain threshold, the presence of a mounting can be inferred. Once the mounting is detected, the sample rate is increased and the data stream is saved for further analysis. The ejaculation detection algorithm is applied to the saved data stream. This algorithm is based on the detection of sudden movements made by the animal during the ejaculation, referred to as "ejaculatory thrust". Mounting and ejaculation detection algorithms are based on well-known pattern recognition techniques: comparison with a predefined threshold, comparison with a signal power threshold, comparison against a well-known waveform (template matching), Principal Component Analysis (PCA), among others.

In cases where there is a need of high savings of battery and/or data traffic, the Device 3 will report to CS 6 for each mounting: date, hour, bull identification number, cow identification number, and an ejaculation presence indicator. Eventually, it could also inform about characteristic data of the acceleration curves: peak-to-peak amplitude, width, maximum, minimum, among others. In the cases where battery duration or the data traffic are not limiting, the device could report: date, hour, bull identification number, cow identification number, and all data stream, in order to perform the analysis in a centralized manner in CS 6. Communication between Reader 11 and Tag 4 can be made in two different manners. On the one hand, Tag 4 can transmit the identification number on demand, each time it is requested by the Reader 11. On the other hand, it can transmit the identification number each time the cow is mounted, with no need for the Reader 11 to request it. In this latter case, transmission can be made a predetermined number of times or during a predetermined period of time.

Since animals within the herd can be located relatively close, it is possible that, during a mounting, another cow (and, therefore, its Tag 4) is close to the cow-bull couple that performed the mounting. In order to avoid incorrect or multiple readings by Reader 11, the present invention is characterized by all cow Tags 4 being disabled for reading by default, being enabled solely by the action of the bull during mounting. For example, in FIG. 3 it can be seen how the mounting of bull 1 involves direct physical contact with Tag 4, which enables the reading. The above mentioned enabling lasts for a short period of time (a few seconds). In this way, it assures that the only read Tag corresponds to the mounted cow.

Tag 4 comprises a microcontroller, a data reception and transmission system having an antenna, a power supply system (which, for example, can be based on the same antenna, thus obtaining energy from the electromagnetic field from the Reader, based on a battery and/or harvest energy from the environment). These elements configure what is normally known as radio-frequency identification tag (hereinafter RFIDTag, identified with number 24 in FIGS. 5 and 6). Moreover, Tag 4 is characterized by having a system 25 (hereinafter InhibSys) that avoids incorrect or multiple tag readings, based on detecting the mounting moment in order to enable the RFIDTag 24 reading of cow 2 mounted during a determined period of time after completion of the said mounting.

Including InhibSys system 25 is crucial in the present invention since this is what allows the identification of the cow that was mounted, with a negligible error margin. Implementation of the said system can be mechanical and/or electronic.

Figure 5:
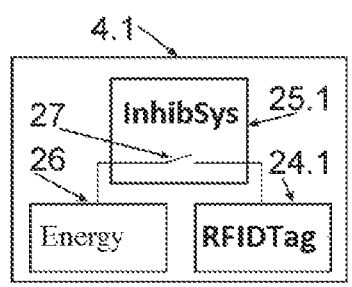
FIG. 5 presents a block diagram of the radio-frequency identification tag 4, wherein a possible implementation of the system to avoid incorrect or multiple readings is detailed. In this case, inhibition is achieved by acting over the energy source.

FIG. 5 shows an example of implementation 4.1 of Tag 4, wherein RFIDTag 24.1 is active, i.e., it is powered from system 26. In this example, InhibSys system 25.1 is characterized by having a switch 27 that enables the power supply from system 26 to RFIDTag 24.1, in order for it to be read as of the start of the mounting and during a certain period of time after its completion. System 26 can be, for example, a battery or a system that harvest energy from the environment.

Figure 6:
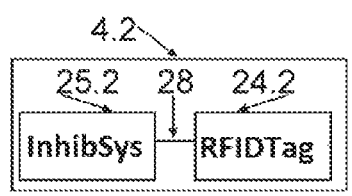
FIG. 6 presents a block diagram of the radio-frequency identification tag 4, wherein another possible implementation of the system to avoid incorrect or multiple readings is detailed. In this case, inhibition is achieved by using a control signal.

FIG. 6 shows another example of implementation 4.2 of Tag 4, wherein RFIDTag 24.2 can be active, passive or semi-passive (the system that powers the RFIDTag 24.2 is not shown in the figure) and it has the characteristic of having an input signal 28 that enables or disables its operation. InhibSys system 25.2 is an electronic or electromechanical circuit that detects the mounting via a switch, accelerometer or vibration detector, and generates signal 28, thus enabling the operation of RFIDTag 24.2 as of the start of the mounting and during a certain period of time after its completion.

Another way of implementation of disabling and enabling Tag 4 reading can be made through the modification of the distance where RFIDTag 24 can be read. In this scheme, disabling is achieved by forcing that the reading can be made if the Reader is less than a few centimeters away, and enabling implies that the reading can be made a few meters away. Even though, in this case, RFIDTag 24 is not disabled by default for reading from a literal point of view (it is always possible to read it from a short distance), for practical purposes it will be disabled, since Device 3 is usually located at a considerable greater distance than the maximum allowed for reading. Then, as of the start of the mounting and for a certain period of time, the maximum distance from which RFIDTag 24 can be read shall be several meters, therefore the corresponding Device 3 will be able to perform the reading. This could be electrically implemented by modifying, for example, some parameter of the RFIDTag 24 antenna. It could also be mechanically implemented, for example: disabling could be obtained by placing a metallic plate in front of RFIDTag 24 in such a manner that the electromagnetic waves are strongly absorbed by it; and the enabling would consist of removing this plate with the purpose of allowing a RFIDTag 24 reading from a significantly greater distance.

Figure 4:
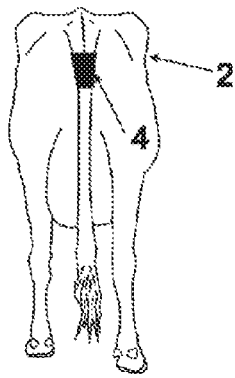
FIG. 4 shows an example of how and where radio-frequency identification tag 4 could be placed on the cow 2.

Tag 4 is placed (even though not exclusively) in the tail of cow 2 (see FIG. 4), or near it, so that bull 1 always is in direct physical contact with Tag 4 during the mounting. As Tag 4 is not inside the animal's body, it is possible to harvest energy from the bull's movements, and reading is facilitated since there are no animal tissues between the said device and Reader 11. On the other hand, Device 3 attachment could be made, even though not exclusively, by placing Device 3 within a housing or wrapping attached by glue to the back of the animal, near its kidneys. It is an area that has a direct view to the tail of the cow when the bull comes down after mounting and where the greatest acceleration with the "ejaculatory thrust", caused by ejaculation, is registered.

Should long-range communication fail to work (for example, for lack of suitable mobile phone coverage), the System proposes to use a Hand-Held that can read information stored on Device 3 through link 102 (which can be wired or wireless) and functions as a hub of the said information for all bulls in the ranch. Accordingly, Hand-Held 5 sends the collected information to the CS 6 via Network 105 through links 103 and 104. By Hand-Held 5 and link 102, it is possible to write and configure Device 3.

Hand-Held 5 can be a mobile phone, a tablet, or an electronic device based on a microcontroller 17 having an interface 18 to communicate with Device 3 via link 102, a user interface 19 that can include, for example, a keyboard and a display, and a plurality of interfaces to communicate with CS 6 (for example, directly via a mobile phone modem, or indirectly via a USB cable plugged to a PC connected to Network 105). all these options are summarized in block 20. As it is a mobile device, it shall have a battery 22. Additionally, it may have an additional memory 23. Finally, Hand-Held 5 has suitable means for reading, writing and configuring Tags 4 via interface 21 using link 107.

CS 6 comprises a set of computers, an energy system, communication elements (routers, firewall, etc.) and human resources for managing and control. CS 6 has a server application capable of managing and processing information received by Device 3 and Hand-Held 5. The collected information is stored on a database. An interface for users to have access to information, via a web browser or an application, is implemented through a web server. This interface has a user access privileges management system in order to select information each user can visualize (for example, ranchers have access only to information of their ranch, but veterinarians can have access to information of all ranches they work for). Moreover, via commands sent by CS 6, it is possible to configure Device 3.

System deployment in a ranch involves installing a Tag 4 in each cow, and a Device 3 in each bull. Moreover, each device must be configured based on operation parameters (animal identification, veterinarian identification, ranch identification, starting date and time, etc.) These parameters are programmed with Hand-Held 5.

Unlike other inventions in the state of the art, our invention is capable of providing information necessary for monitoring the breeding season; i.e., if the bull has performed mountings, and which cows have been mounted, date and time and the effectiveness (i.e., if there was or not ejaculation). This is achieved thanks to the possibility of identifying, with no error margin (or with a negligible error margin), the mounted cow, through a system that avoids incorrect or multiple tag readings; as well as through determining the presence of ejaculation based on a detection algorithm of the "ejaculatory thrust".

In addition to monitoring the breeding season, the System can be used for other applications. On the basis of having no better estrus detector than the bull itself, the System can be applied for estrus detection in the case of artificial insemination. Indeed, using the above mentioned System in androgenized and neutered bulls, which are capable of mounting but not impregnating, information regarding which cows are in heat is directly obtained. This cannot be guaranteed by other systems that cannot identify the cow without error margin.

Another application of the present invention would be using the System to determine the animals "pedigree". Nowadays, in general, parents are not known and/or registered. Having this information would serve for enhancing a traceability system, easily allowing the addition of the father and mother identification to the available information. As a result, genetic enhancement, avoidance of genetic diseases, etc., could be explored. This function cannot be provided by other systems that cannot determine the presence of ejaculation.

Another example would be using the System as substitution for the "Blackey test". Blackey test is a test that allows the assessment of the number of cows that a bull is capable of mounting in a determined period of time (referred as "service capacity"). The above mentioned test is performed in such an invasive manner that does not respect animal welfare: the cow is restrained, and the number of times the bull can mount it are counted. By the present System, the actual service capacity of a bull can be determined in a natural way, respecting animals and their welfare. This cannot be provided by other systems that cannot determine the presence of ejaculation.

Although in the foregoing description reference is made to cows and bulls, all the points claimed in the present patent can apply to any animal species whose reproductive process involves characteristic movements that can be related to a mounting and an ejaculation.

The invention claimed is:

1. System for the monitoring of the reproductive activity of animals, whose mating is made via a mounting, which allows: determining each mounting performed by each male, determining if there was ejaculation in the mounting or not, identifying the mounted female in each case, and determining the date and time of each one of the mountings, characterized by comprising:

a radio-frequency identification electronic device attached to each female, used to identify it, an electronic sensor device attached to each male having
a sensor for determining the mounting and ejaculation,
a radio-frequency identification electronic device reader for identifying the mounted female, and having means for registering date and time, as well as transmitting all information to a hand-held electronic device and/or a central system, a system for avoiding incorrect or multiple radio-frequency identification electronic devices readings, consisting in that each radio-frequency identification electronic device placed on the female can only be in two possible states: a first state that does not allow reading by the electronic sensor device placed on the male; and a second state wherein reading by the electronic sensor device placed on the male is possible; and wherein this latter state is achieved by the presence of a mounting of a female having the said radio-frequency identification electronic device installed, and wherein this state is finished after a certain amount of time after the completion of the mounting, in order to return to the state that prevents the reading, a hand-held electronic device having the means for configuring and collecting the information produced by the electronic sensor device attached to the males, which has the means for configuring and programming the radio-frequency identification electronic device placed on the females, and having the means for communicating with the central system, and a central system concentrating and managing the information sent by hand-held electronic devices and/or electronic sensor devices attached to the males.

2. System as claimed in claim 1, wherein the radio-frequency identification electronic device attached to the females is passive.

3. System as claimed in claim 1, wherein the radio-frequency identification electronic device attached to the females is active, and the power supply used can be from a battery and/or harvesting energy from the environment.

4. System as claimed in claim 1, where all or part of the energy that powers the radio-frequency identification electronic device of the mounted female can be from harvesting energy from the movements made by the male during mounting.

5. System as claimed in claim 3, wherein the radio-frequency identification electronic device attached to females transmits their identification number each time it is requested by the electronic sensor device.

6. System as claimed in claim 3, wherein the radio-frequency identification electronic device attached to females transmits their identification number each time it is mounted without being requested by the electronic sensor device, where the transmission can be made a predetermined number of times or during a predetermined period of time.

7. System as claimed in claim 3, wherein the two possible states of the radio-frequency identification electronic devices placed on females consist of enabling the power supply of the radio-frequency identification electronic device of the mounted female during the mounting, and disabling it after a determined period of time after the completion of the mounting.

8. System as claimed in claim 1, wherein the two possible states of the radio-frequency identification electronic devices consist of modifying the maximum reading distance of the radio-frequency identification electronic device, and wherein the state preventing reading of the radio-frequency identification electronic device is implemented by placing a maximum distance for reading of a few centimeters, and the state allowing reading is implemented by placing a maximum reading distance greater than a few meters.

9. System as claimed in claim 8, wherein the maximum reading distance of the radio-frequency identification electronic device attached to females is modified by changing some parameter of the radio-frequency identification electronic device antenna.

10. System as claimed in claim 1, wherein the two possible states of the radio-frequency identification electronic devices placed on females are defined by a binary signal enabling or disabling the said device reading.

11. System as claimed in claim 10, wherein the binary signal is generated by an electromechanical circuit, which, when it detects the mounting, generates the enabling signal of the radio-frequency identification electronic device reading, and, a certain period of time after the completion of the said mounting, it generates the disabling signal.

12. System as claimed in claim 1, wherein the radio-frequency identification electronic device attached to the females is placed and attached to the back exterior part of the animal, such that the same is pressed by the male when the female is mounted.

13. System as claimed in claim 12, wherein the radio-frequency identification electronic device attached to the females is placed and attached by surrounding the tail of the animal.

14. System as claimed in claim 1, wherein the hand-held electronic device has the means for communicating with the electronic sensor device attached to the males for configuration and extraction of registered information, has the means for configuring the radio-frequency identification electronic devices placed on females, and has the means for communicating with the central system, characterized by comprising:
 a user interface,
 a radio-frequency identification electronic device reader and writer,
 a set of microcontrollers,
 a set of volatile and/or non-volatile memory,
 one or many communication systems,
 a real-time clock system, and
 a power supply system.

15. System as claimed in claim 14, wherein the communication system of the hand-held electronic device having the central system uses a long range wireless communication technology selected from the group consisting of: mobile phone data, WiFi, WiMax, Satellite and combinations thereof.

16. System as claimed in claim 14, wherein the communication system of the hand-held device with the central system consists of transferring data to a personal computer, which is in turn connected to the central system.

17. System as claimed in claim 14, wherein the user interface of the hand-held electronic device consist of a keyboard and a screen.

18. System as claimed in claim 14, wherein the user interface of the hand-held electronic device consists of a touchscreen.

19. Electronic sensor device for monitoring reproductive activity of animals, whose mating is made via a mounting, and that, attached to the body of a male, allows: determining if the said animal has mounted another animal, determining if there was or not ejaculation on the said mounting, identifying the mounted animal through the reading of the radio-frequency identification electronic device, determining the date and time of the mounting, and having the means for transmitting this information to a hand-held electronic device and/or a central system, characterized by comprising:
 a sensor for mounting detection,
 a sensor for ejaculation detection,
 a radio-frequency identification electronic device reader,
 a set of microcontrollers,
 a set of volatile and/or non-volatile memory,
 one or many communication systems,
 a real time clock system, and
 a power supply system.

20. Electronic sensor device of claim 19, which is placed in the back exterior part of the animal and is attached via a contact glue.

21. Electronic sensor device of claim 19, wherein the communication system with the central system uses a public data network and/or a private data network.

22. Electronic sensor device of claim 19, wherein the communication system with the central system uses at least one of the following: long-range wireless communication technology, namely: mobile phone data, WiFi, WiMax, and Satellite.

23. Electronic sensor device of claim 19, wherein the communication system with the hand-held electronic device uses at least one of the following: short-range wireless communication technology: NFC, Bluetooth, or WiFi.

24. Electronic sensor device of claim 19, wherein the communication system with the hand-held electronic device uses a wired communication technology, selected from the group consisting of: USB, RS232, I2C, SPI, ethernet, landline data, and combinations thereof.

25. Electronic sensor device of claim 19, wherein the power supply system is a battery or works from harvesting energy from the environment.

26. System as claimed in claim 1, wherein the electronic sensor device attached to males comprises
 a sensor for mounting detection,
 a sensor for ejaculation detection,
 a radio-frequency identification electronic device reader,
 a set of microcontrollers,
 a set of volatile and/or non-volatile memory,
 one or many communication systems,
 a real time clock system, and
 a power supply system,
and the hand-held electronic device, has the means for communicating with the electronic sensor device attached to the males for configuration and extraction of registered information, has the means for configuring the radio-frequency identification electronic devices placed on females, and has the means for communicating with the central system, characterized by comprising:
 a user interface,
 a radio-frequency identification electronic device reader and writer,
 a set of microcontrollers,
 a set of volatile and/or non-volatile memory,
 one or many communication systems,
 a real-time clock system, and
 a power supply system.

27. System as claimed in claim 26, wherein the collected information is used for diagnose and monitoring of the state of an extensive livestock farming herd.

28. System as claimed in claim 26, which is used for heat detection, characterized by using neutered and androgenized males.

29. System as claimed in claim 26, used for assessing the service capacity of a male.

30. System as claimed in claim 26, used for registering the pedigree of unborn animals.

* * * * *